Nov. 20, 1962   W. P. LA FORCE   3,064,698
ANTI-FRICTION BLADE AND GUIDE
Filed Aug. 28, 1959   2 Sheets-Sheet 1
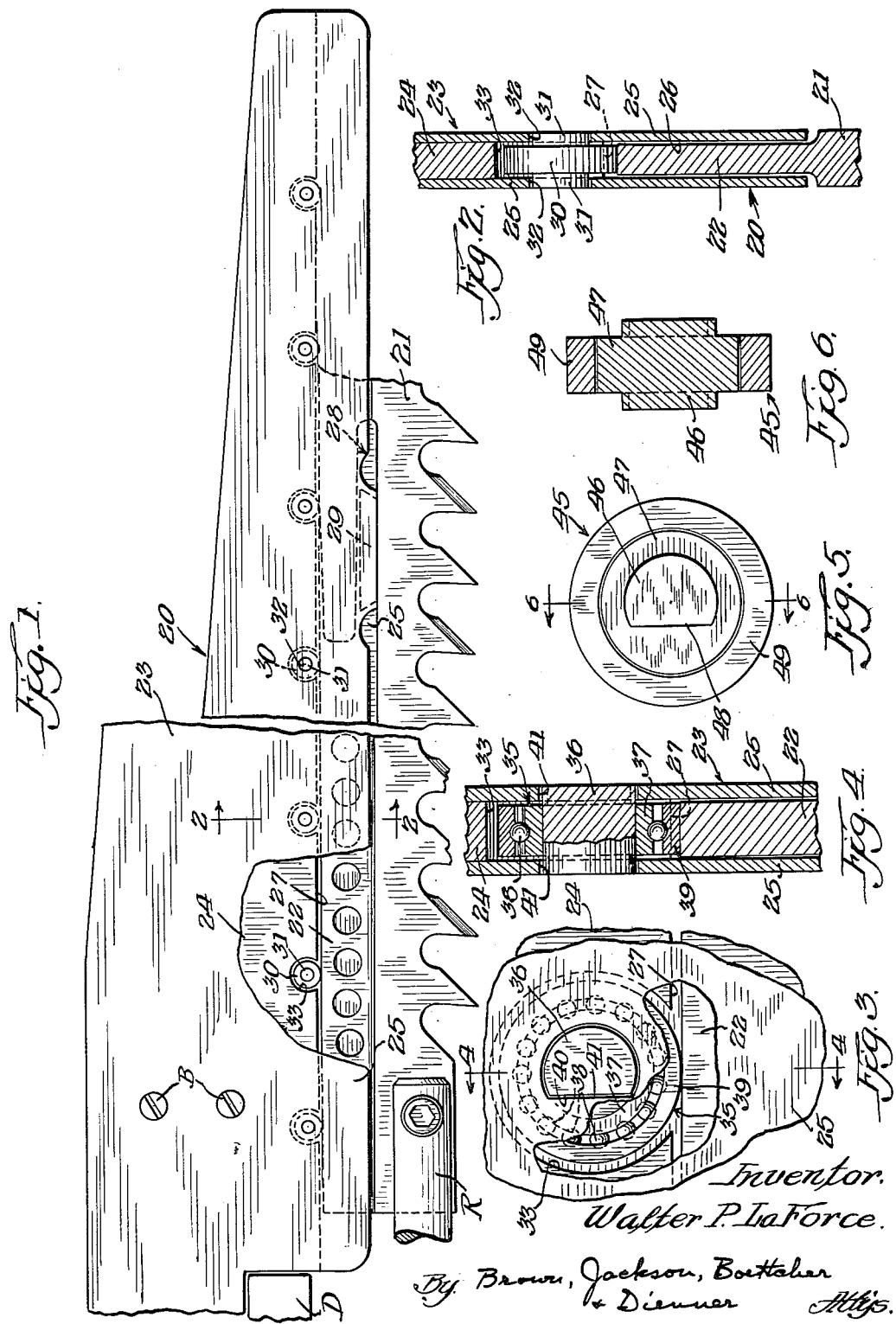
Inventor.
Walter P. LaForce.
By Brown, Jackson, Boettcher
& Dienner   Attys.

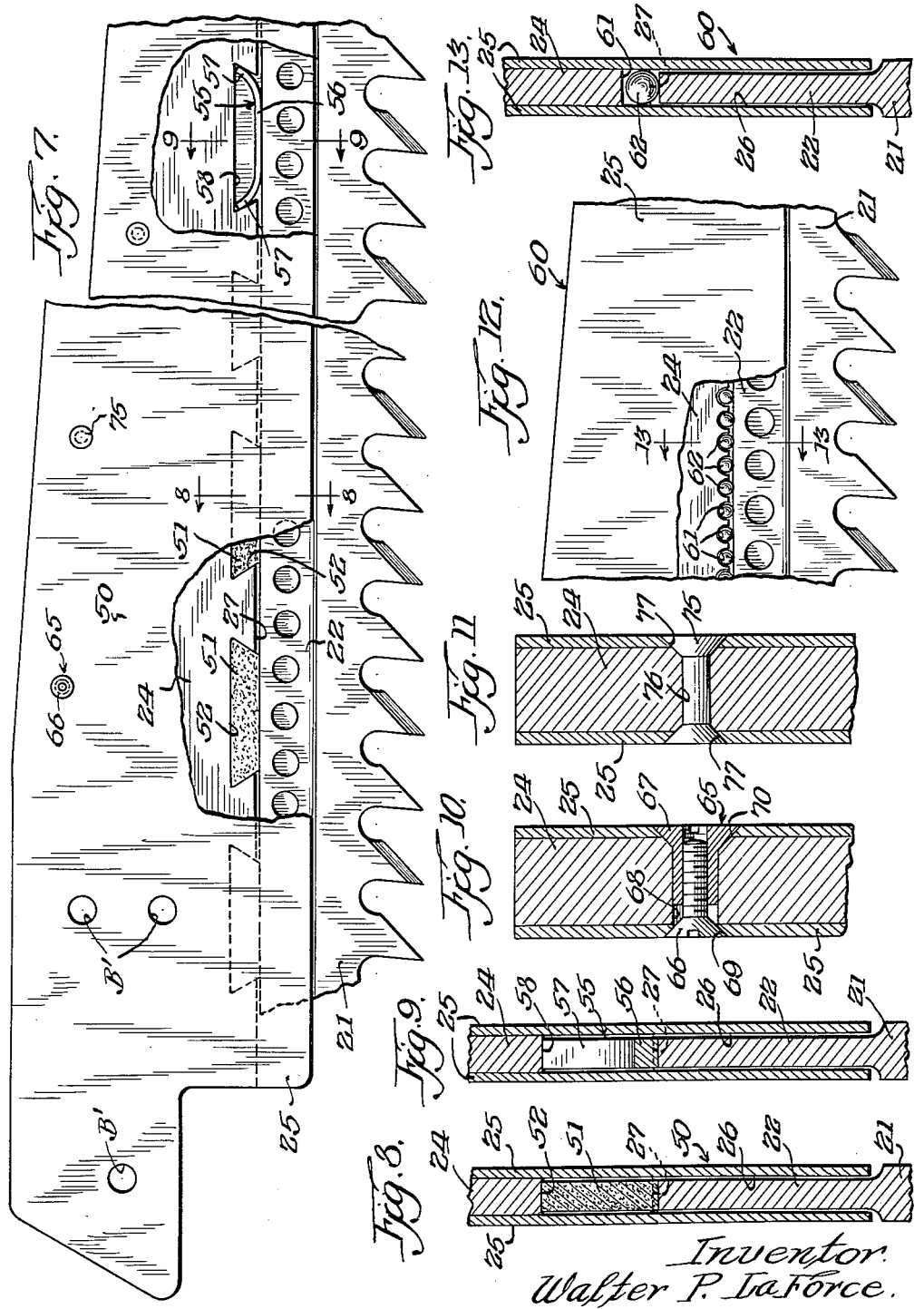

United States Patent Office 3,064,698
Patented Nov. 20, 1962

3,064,698
ANTI-FRICTION BLADE AND GUIDE
Walter P. La Force, Sheboygan, Wis., assignor to Thomas Industries, Inc., Louisville, Ky., a corporation of Delaware
Filed Aug. 28, 1959, Ser. No. 836,781
1 Claim. (Cl. 143—162)

The present invention relates to tools or like constructions employing a reciprocating blade in a guide channel, and more particularly to an anti-friction blade and guide construction.

The invention is disclosed specifically as incorporated in a reciprocating blade saw in which the saw moves in a channel, groove, or slot of a stationary guide, although it will be apparent that the invention is not limited to saws. In use, the friction between the reciprocating blade and the guide structure results in wastage of a considerable proportion of the available power, and also causes undesirable heating of the parts, in many cases causing such overheating as to result in failure. These difficulties are overcome by the present invention through the employment of anti-friction means which greatly reduce the friction between the parts and thus eliminate as far as possible the undesirable results of such friction. As explained in detail hereinafter, the anti-friction means may take various forms and may be applied or mounted in different ways. The invention also contemplates the provision of a blade and guide construction which lends itself to ready application, removal, and replacement of the anti-friction means. This is accomplished by making the guide portion of separable parts which normally are secured by removable fastening means in tightly assembled relation.

It is accordingly an object of the invention to provide an anti-friction blade and guide construction by which the undesirable effects of friction of a blade reciprocable longitudinally of an elongated guide structure are greatly minimized.

Another object of the invention is the provision of an anti-friction blade and guide construction providing anti-friction means operative between the guide structure and the blade reciprocable longitudinally thereof, to result in effective use of a greater proportion of the available power for driving the blade, or to permit the use of less powerful driving means.

Still another object is the provision of anti-friction means in a construction employing a blade reciprocable longitudinally of an elongated guide structure, so as to avoid the possibility of failure of the parts due to overheating resulting from friction.

A further object is the provision of an anti-friction blade and guide construction making provision for ready initial assembly of anti-friction means therein, and for simple and easy access to the anti-friction means for removal and replacement thereof when desired.

Other and further objects, advantages, and features of my invention will be apparent to those skilled in the art from the following detailed description, together with the accompanying drawings, in which:

FIGURE 1 is fragmentary side elevational view of a reciprocating saw, partly broken away for clearness, embodying the present invention;

FIGURE 2 is an enlarged cross-sectional view taken substantially as indicated by the line 2—2 of FIGURE 1 showing one form of roller which may be employed to minimize friction;

FIGURE 3 is an enlarged fragmentary side elevational view of a structure similar to that shown in FIGURE 1, with parts broken away for clearness, and showing a different form of roller from that of FIGURE 2;

FIGURE 4 is a cross-sectional view taken substantially as indicated by the line 4—4 of FIGURE 3;

FIGURE 5 is a side elevational view of another form of roller which may be employed;

FIGURE 6 is a cross-sectional view taken substantially as indicated by the line 6—6 of FIG. 5;

FIGURE 7 is a side elevational view generally similar to FIGURE 1, but showing a somewhat different embodiment of the invention;

FIGURE 8 is an enlarged cross-sectional view taken substantially as indicated by the line 8—8 of FIGURE 7 and showing one form of anti-friction insert;

FIGURE 9 is an enlarged view similar to FIGURE 8, taken substantially as indicated by the line 9—9 of FIGURE 7, and illustrating a resilient type of anti-friction insert;

FIGURE 10 is a cross-sectional of a structure similar to that of FIGURE 7, showing one form of fastening means for detachably securing together the separable parts of the guide structure;

FIGURE 11 is a view similar to FIGURE 10, but showing another form of fastening means;

FIGURE 12 is a fragmentary elevational view of an anti-friction blade and guide construction according to the invention, with a portion broken away, and illustrating one manner of employing anti-friction ball bearings in such construction; and FIGURE 13 is an enlarged cross-sectional view taken substantially as indicated by the line 13—13 of FIGURE 12.

Referring first to FIGURES 1 and 2 of the drawings, there is shown a reciprocating saw indicated generally at 20, and comprising a blade 21 having one longitudinal edge toothed and the other formed with a marginal tongue portion 22 of reduced thickness. The tongue portion 22 is received in a guide structure 23 which may conveniently be formed of a central or core lamination 24 and outer or side laminations 25, one on each side of the center lamination 24, which adjacent one edge thereof project therebeyond for any suitable distance to define the sides of a groove or channel 26 the bottom of which is defined by the adacent edge of the central lamination 24. The guide is preferably formed of a suitable metal such as steel, and the laminations are secured in tightly engaged relation by spot welding or any other suitable means (not shown). The tongue portion 22 of the blade 21 is received in the channel 26, having a slight clearance with the outer or side laminations 25 of the guide structure, or in other words having a thickness slightly less than that of the channel, and having a breadth not substantially greater than the depth of the channel. The length of the tongue portion 22 corresponds substantially to that of the blade, although it may vary therefrom, and as will be obvious, may be divided into a number of portions instead of being continuous. Reciprocation of the blade 21 longitudinally is thus maintained in substantially the desired plane by the engagement of the tongue portion 22 in the channel 26 of the guide structure 23. The guide structure as shown in FIGURE 2 is not of greater thickness than the blade 21, although it may be slightly thicker so long as it does not bind in the kerf cut by the blade teeth. The guide structure may be secured in any suitable manner at one end, as by bolts B, to a power drive mechanism D which may include means for grasping by an operator, and also includes a reciprocating driving rod R suitably secured to the adjacent end of the blade 21. Adjacent its other end, the blade has the tongue portion formed with a slot 28 by means of which it may be engaged with a key construction 29 of the guide 23, so that the blade is retained in the desired engagement with the guide structure by means of the rod R and the key arrangement. This key arrangement may of course be replaced by other retaining means, and since the specific details thereof do not form any part of the present invention no further description thereof is deemed necessary herein. The guide may, as shown, taper in width from the end secured to the drive mechanism longitudinally to its free end.

To minimize the friction between the blade and the guide structure, anti-friction means are provided, shown in FIGURES 1 and 2 as in the form of rollers 30. Each of the rollers 30 is preferably of a solid, one-piece construction, having shaft portions or trunnions 31 extending from opposite sides of the main body or roller portion, to journal the roller in the outer side laminations 25, which are provided with opposed apertures 32 rotatably receiving the trunnions 31. The rollers 30 are each disposed in a suitably formed recess 33 in the central or core lamination 24 of the guide structure 23, each substantially aligned with and located between each pair of opposed apertures 32, and opening through the bottom 27 of the channel 26. The location of the apertures 32 and thus of the roller axes, relative to the open end of the channel 26 and the respective recesses 33 is such that the rollers 30 project into the channel 26 and engage the edge of the tongue portion 22 of the blade, with the thicker blade portion being spaced from the edges of the outer side laminations 25 defining the channel, as will be evident particularly from FIGURE 2. The rollers are arranged in longitudinally spaced relation along the channel 26, any suitable number thereof being employed. A slight clearance is provided between the rollers and the inner surfaces of the side laminations 25, insufficient to allow any great projection of either trunnion 31 outwardly of the guide. The axial dimension of the shaft portion of roller 30 is preferably no greater than the thickness of the guide 23, and may be less.

It will be evident that by reason of the rollers 30, the blade 21 when reciprocated by the drive mechanism D through the rod R will move smoothly and with far less friction than if the rollers were not employed, the edge of the portion 22 of the blade being held out of contact with the bottom 27 of the guide channel 26 by the rollers, and the thicker portion of the blade similarly being held out of contact with the longitudinal edges of the outer side laminations 25 of the guide structure. It will also appear that by reason of the guide structure 23 not being of any substantially greater thickness than the blade 21, the guide may pass into and through the kerf cut by the blade, the trunnions 31 not affording any impediment to such movement, so that the entire construction may be passed through thick material without difficulty and facilitate the cutting thereof.

In FIGURES 3 and 4 there is shown a somewhat different form of anti-friction roller which may be employed in the blade and guide construction of this invention. The roller 35 illustrated in these figures comprises a steel shaft 36 on which there is press fitted an inner race 37 for a plurality of small ball bearings 38 over which engages an outer race 39 for rotation relative to the shaft and inner race, the outer race 39 constituting the rolling portion of the roller and engaging the edge of the top portion 22 of the blade. The rollers 35 are mounted in the guide structure 23, which is of substantially the same form as described in connection with FIGURES 1 and 2, comprised by laminations 24 and 25 arranged to define the channel 26, and with roller-receiving recesses 33 formed in the central or core lamination 24, in substantially the same way as the rollers 30 previously described. In this case, however, at least one end portion of the shaft 36 is provided with a flat 40, and a correspondingly shaped aperture 41 is provided in the adjacent side lamination 25 to receive the flatted shaft end portion in non-rotatable relation.

As evident from FIGURE 4, both end portions of the shaft 36 are preferably provided with the flat, and the apertures in both laminations 25 are correspondingly shaped. Of course, the shaft might otherwise be formed with a non-circular configuration at its ends and the side laminations 25 of the guide structure 23 correspondingly apertured to hold the shaft against rotation.

A slightly different type of roller 45 is illustrated in FIGURES 5 and 6. The roller has a shaft 46 the central portion 47 of which may be enlarged, and the end portions of which may have a flat 48 similar to the flat 40 described in connection with the roller 35, or may be otherwise formed of non-circular shape. Loosely fitted about the central portion 47 of shaft 46 is an annular roller portion 49. The shaft of the roller 45 is made of bronze, for example, and the roller portion 49 may be made of a suitable hardened steel, the roller portion 49 rotating on the shaft with relatively little friction therebetween and with relatively slow wear. The rollers 45 are mounted and arranged with relation to the guide structure 23 and blades 21 in the same manner as the rollers 35 previously described, with the non-circular ends of shafts 46 engaged in correspondingly shaped apertures in the side laminations.

It will be obvious that other forms of rollers might be provided, although it should be recognized that in general the simpler the construction of the roller the better, since the limited width or thickness of the guide structure 23 limits the thickness of the roller and thus militates against roller constructions employing a multitude of parts the necessarily small size of which is likely to render assembly difficult and increase the cost thereof. In any case, the length of the shaft or the greatest axial dimension of each roller should be not greater than the thickness of the guide structure, and preferably is somewhat less, if anything.

Referring now to FIGURES 7 and 8, there is shown a guide structure 50 which is generally similar to the guide structure 23 previously described, and similarly formed of at least three laminations of which the central or core lamination 24 determines the width of the channel 26 provided by the projecting edge portions of the outer side laminations 25, as in the case of the guide structure 23. The blade 21 with a reduced tongue portion 22 received in the channel 26 is provided as in the first-described embodiment. The guide structure 50 may be provided with a plurality of bolt holes B' or the like for securing of the structure to a drive mechanism or similar operating means. The blade 21 may be retained in engagement with the guide structure for longitudinal reciprocation by means such as previously described.

In this construction, the anti-friction means for reducing friction between the blade and the guide structure is illustrated as comprising a plurality of blocks 51 of suitable anti-friction material. The blocks 51, for example, may be of a suitable bronze composition, or a porous metallic material impregnated with oil or other lubricant. The blocks are disposed in recesses 52 formed in the central or core lamination 24 of the guide structure 50, and spaced therealong at appropriate intervals, the recesses opening through the bottom 27 of the channel 26. The blocks 51 are so dimensioned and disposed as to project slightly out of the recesses so as to engage the edge of the tongue portion 22 of the blade and hold it out of contact with the channel bottom 27. In the present instance, the recesses 52 are shown as of dovetail or undercut form for firm retention of correspondingly shaped blocks 52, but it will be obvious that they may be of any desired shape, and the blocks similarly may vary from the configuration shown. It will be evident that if desired the anti-friction block arrangement may include resilient means for urging the blocks out of the recesses so as to compensate for wear thereof.

In FIGURES 7 and 9, there is shown another possible form which the anti-friction means may take, in this case a plurality of springs 55, only one of which is illustrated. Each spring 55 is formed of a strip of suitable resilient material, such as steel, and has a central substantially flat portion 56 and bent end portions 57 by means of which it is retained in the guide structure, as for example the guide structure 50 shown in FIGURE 7. In the present instance, the spring 55 is shown as mounted in the guide structure by means of its engagement in a recess 58 substantially similar to the recesses 52 hereinbefore described, which is undercut for reception of the bent portions 57 of the spring in the angular undercut portions thereof and with the central portion 56 projecting from the recess into the channel 26 to engage the edge of the tongue portion 22 of the reciprocable blade 21 and hold it in spaced relation to the bottom 27 of the channel, as will be apparent from both FIGURES 7 and 9. It will be evident that the central portion 56 of the spring 55 need not be formed substantially flat, and if desired may be bowed, and be flattened by the pressure of the blade acting thereon, in operation of the device. The springs 55, of course, might be mounted and retained in the guide structure by other means than those specifically disclosed, and furthermore might be replaced by other forms of resilient bearing means which would operate to reduce friction between the blade and guide structure in substantially the same manner as the springs 55.

In FIGURES 12 and 13 there is illustrated a ball bearing arrangement serving as the anti-friction means for minimizing friction between the blade and guide structure in accordance with the present invention. In this embodiment of the invention, the guide structure 60 is formed of a plurality of laminations 24 and 25 as in the previously described guide structures 23 and 50, with a channel 26 defined longitudinally thereof having a bottom 27 determined by the edge of the central lamination 24. A number of arcuate pockets 61 are formed extending transversely of the edge of the central lamination 24, in each of which is disposed a ball 62 engaging the edge of the tongue portion 22 of the blade in the channel 26, the balls projecting slightly out of the pockets 61 so as to maintain the desired spacing between the edge of the tongue portion 22 and the bottom 27 of the channel. The employment of ball bearings as anti-friction elements between the guide structure and the blade, of course, is a very effective way of minimizing friction. The balls 62 are retained in the pockets 61 and between the side laminations 25 with a slight clearance as to the latter, the diameter of the balls 62 being slightly less than the width of the channel 26.

It will be obvious that other arrangements of ball bearings than that specifically disposed may be employed, and various modifications in the guide structure may be provided to accommodate such different arrangements. For example, instead of the arcuate pockets 61, substantially spherical pockets might be formed, either wholly within the central lamination 24 or partly in the central lamination and partly in the outer side laminations 25, for receiving the balls 62. Again, apertures might be formed in the outer side laminations 25 for rotatably mounting ball bearings of a diameter substantially equal to the overall thickness of the guide structures. The apertures might be elongated slots which would accommodate a plurality of balls, instead of their being circular and adapted for receiving or mounting only a single ball. Similarly, the edge of the central or core lamination 24 may have an arcuate groove running the full length thereof to receive a string of ball bearings, or a similar groove might be formed partly in the central lamination and partly in the side laminations, if desired.

In each of the embodiments of the invention described, the anti-friction means or elements, it will be noted, may readily be mounted or applied in the guide structure by disposing them in the recesses or similar retaining structure provided therefor in the central or core lamination 24 of the guide structure, before assembly of at least one of the outer side laminations 25 therewith, and the retaining structure then completed by application of the laminations 25 to the opposite sides of the central lamination 24. It has been pointed out that the laminations may be held in the assembled relation by spot welding or other suitable means. In cases where the anti-friction means may require replacement from time to time, either because of excessive wear or for other reasons, it is advantageous to employ a removable securing arrangement for detachably holding the laminations of the guide structure in the tightly assembled relation desired in use. While of course many types of detachable securing elements might be employed to provide for the ready and secure assembly and disassembly of the guide structure so as to permit replacement of the anti-friction means, two arrangements for accomplishing this purpose are specifically disclosed herein.

In FIGURES 7 and 10, there is shown a screw construction 65 for securing the laminations together. The screw generally designated as 65 comprises a male screw 66 and a female screw 67 internally threaded to receive the male screw 66, a bore 68 being provided through the central lamination 24 of the guide structure to accommodate the shank of the female screw 67, the bore 68 extending in alignment with countersunk apertures 69 and 70 by which the heads of the male and female screws, respectively, are received so as to lie substantially flush with the outer surfaces of the side laminations 25. By employing a plurality of the screws 65 at appropriate points throughout the extent of the guide structure, the laminations may be securely tightened in assembled relation and readily separated when desired. It will be appreciated that the guide structure must be of sufficient thickness to provide for a secure threaded engagement of the male and female screws.

Another manner of detachably securing the laminations of the guide structure together is illustrated in FIGS. 7 and 11. This requires merely the employment of rivets 75 which have the shanks thereof extending through bores 76 through the center lamination 24 of the guide structure, the opposite ends of the bore 76 being countersunk as at 77, the countersinks extending through the outer laminations 25, to accommodate the head or end portions of the rivets. It is to be noted that the rivets are formed so that the heads thereof are substantially flush with the outer surfaces of the side laminations 25. The use of rivets is not quite as desirable as other removable fastening means, since the rivets must be punched out when the guide structure is to be disassembled, but it does accomplish the desired purpose.

It may be noted that while the guide structure has in each base been disclosed as comprising three laminations, the number of laminations might be varied if desired. For example, the central or core lamination 24 might be formed of a number of laminations instead of a single one. It will also be appreciated that while for convenience the invention has been disclosed as embodied in a reciprocating saw construction, the invention is not limited to saws, but finds application in any comparable construction in which a blade or like member is longitudinally reciprocable in a guide member. Of course, if desired, the interengaging channel and tongue portions may be provided on the blade and the guide structure, respectively, instead of on the guide structure and blade as specifically illustrated and described. Furthermore, the edge of the tongue portion may be concave in cross section and the anti-friction elements may be formed with correspondingly convex portions engaging in the concavity, to assist in centering and guiding the blade. The thickness of the guide structure relative to that of the blade need not be limited to that shown and described where it is not desired or necessary to allow passage of the guide structure into or through the cut made by the blade, or where the blade is provided or employed for other purposes than sawing or cutting. It is not necessary, although ordinarily it is desirable for uniformity, that all of the anti-friction elements employed in a particular blade and guide construction be the same, since different types or kinds of such elements may be used in the same construction.

While I have described and shown what I regard to be the preferred embodiments of my invention, nevertheless it will be appreciated that various changes, rearrangements and modifications may be made therein without departing from the scope of the invention, as defined by the appended claim.

I claim:

An anti-friction reciprocating blade and guide construction comprising an elongated guide structure, a one-piece blade reciprocable longitudinally of said guide structure, a channel formed on one and a tongue portion formed on the other of said guide structure and blade, said tongue portion being disposed in said channel and having a thickness less than that of the channel of the guide structure to define clearance therewith and a thickness less than that of the blade to define a shoulder along at least one side thereof, and a plurality of anti-friction elements mounted so as to maintain the edge of the tongue out of contact with the confronting bottom of the channel and to space each said shoulder from the guide structure adjacent the channel mouth, said anti-friction elements comprising rollers of solid construction having opposed shaft portions projecting axially, and the sides of said guide member which define the channel having opposed openings receiving said shaft portions for rotation therein, the axial thickness of said rollers being such that clearance is provided between the rollers and the inner surfaces of said sides of said guide member which define the channel, and the axial dimensions of the shaft portions of the rollers being such as not to afford an impediment to the guide structure passing through the kerf cut by the blade even though lateral movement of said rollers causes their shaft portions to shift axially in said openings.

References Cited in the file of this patent

UNITED STATES PATENTS

| | | |
|---|---|---|
| 395,797 | Perry | Jan. 8, 1889 |
| 962,502 | Elmborg | June 28, 1910 |
| 2,759,773 | Wilmer et al. | Aug. 21, 1956 |
| 2,776,680 | Waddell | Jan. 8, 1957 |
| 2,784,751 | Alexander | Mar. 12, 1957 |
| 2,895,514 | Wright | July 21, 1959 |

FOREIGN PATENTS

| | | |
|---|---|---|
| 722,595 | France | Jan. 4, 1932 |